Nov. 7, 1967   W. KARL   3,350,765
TERMINAL APPLYING MACHINE
Filed July 29, 1965   9 Sheets-Sheet 1

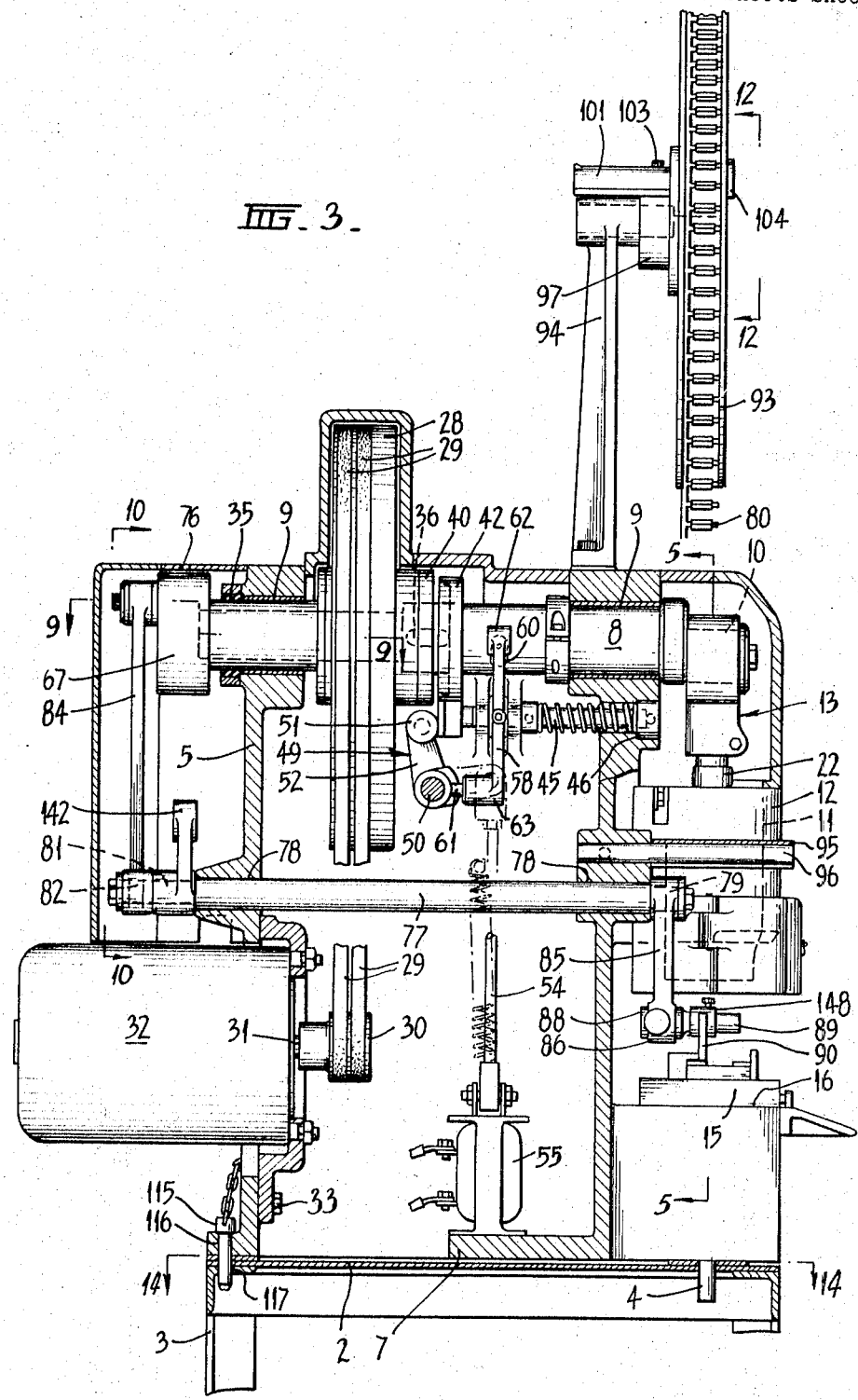

Nov. 7, 1967 — W. KARL — 3,350,765
TERMINAL APPLYING MACHINE
Filed July 29, 1965 — 9 Sheets-Sheet 3

Nov. 7, 1967 W. KARL 3,350,765
TERMINAL APPLYING MACHINE
Filed July 29, 1965 9 Sheets-Sheet 5

Nov. 7, 1967    W. KARL    3,350,765
TERMINAL APPLYING MACHINE
Filed July 29, 1965    9 Sheets-Sheet 7

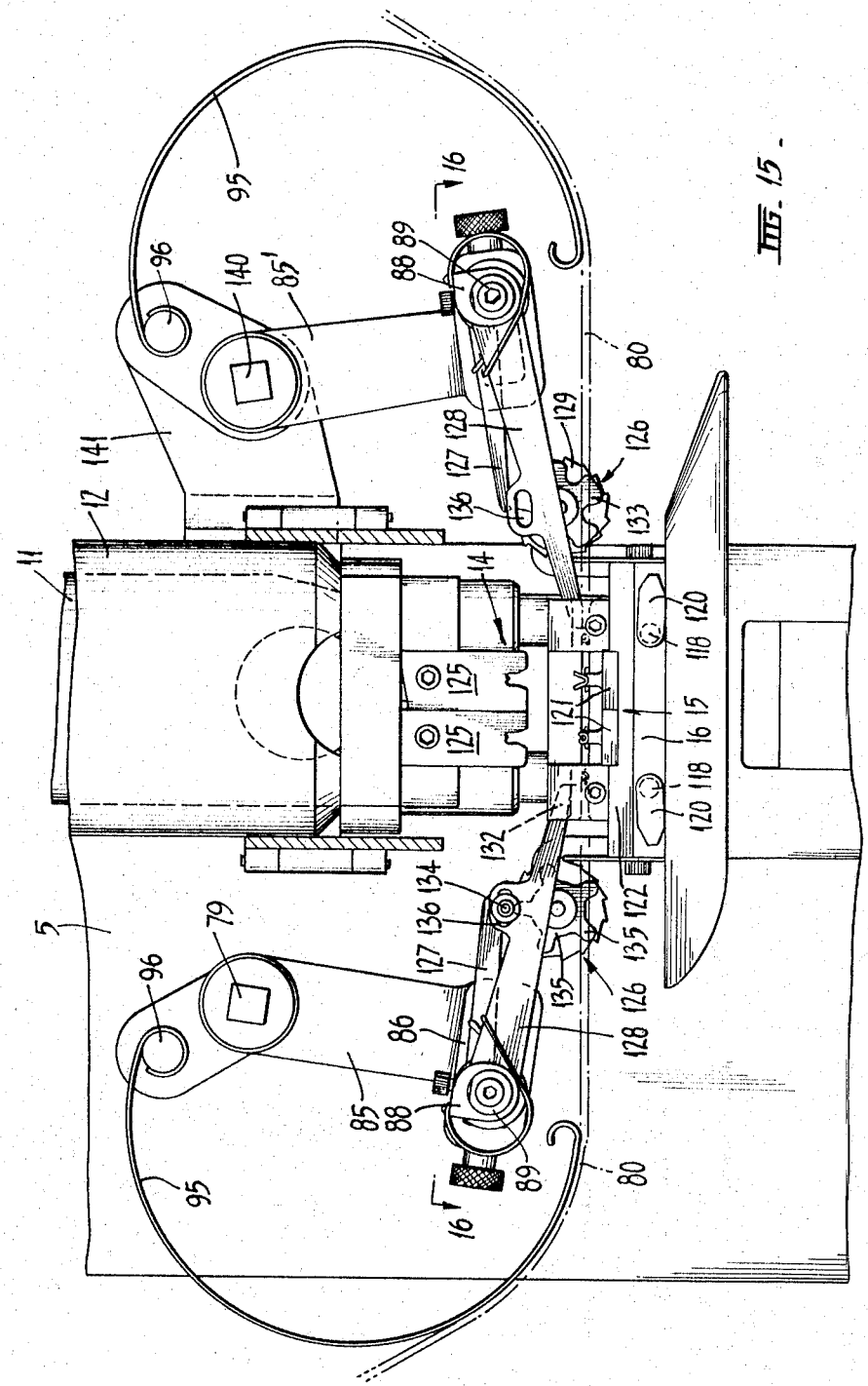

United States Patent Office 3,350,765
Patented Nov. 7, 1967

3,350,765
TERMINAL APPLYING MACHINE
Walter Karl, Riverwood, New South Wales, Australia, assignor to Utilux Proprietary Limited, Kingsgrove, New South Wales, Australia
Filed July 29, 1965, Ser. No. 475,823
Claims priority, application Australia, July 29, 1964, 47,518/64
18 Claims. (Cl. 29—203)

ABSTRACT OF THE DISCLOSURE

A power driven terminal applying machine in which terminal feed pawls located on opposite sides of a vertically reciprocating slide carrying an upper die are driven in timed relation with the die to feed terminal strips horizontally to a fixed lower die and provide automatic delivery of the terminals to the fixed die.

---

This invention relates to machines for successively separating terminal connectors from a continuous strip thereof and for attaching them by crimping or otherwise to conductors.

Machines of this kind are already known and are generally semi-automatic in operation whereby when a treadle switch or the like is actuated by an operator, the machine undergoes a single cycle of operating during which the terminal strip is fed forwardly, e.g. from a reel thereof, and coacting dies are closed in order to sever the leading terminal from the strip and secure it to a conductor end previously arranged in the requisite position.

Terminal connectors of a considerable variety of different kinds are applied by machines of this kind, the individual connectors being usually arranged transversely on the strip thereof, and being initially integrally connected together by narrow necks of the metal strip. According to the type of connector being used, it may be necessary to feed the strip to the dies either from the left or from the right as the machine is viewed from the front and at the present time, separate left and right hand feed machines are used for applying these different types of connectors.

In other cases, the terminals are arranged longitudinally or in line in the strip which requires that the conductor be similarly arranged with respect to the strip when it is inserted into the machine and special purpose rear feed machines are usually provided for this purpose also. The design of some existing side feed machines is such that they may be used as rear feed machines for which purpose, the operator is moved from the front of the machine to that side thereof which is opposite to the side from which the strip is fed.

The terminal strip is usually fed intermittently forwards to the die by ratchet-type feed mechanism comprising a crank-operated pivoted pawl which is arranged above the strip as it approaches the dies so as to engage the successive terminals thereof. As the leading terminal must be accurately registered with the coacting dies, it is necessary to ensure that the strip does not overrun during the forward or advancing movements of the feed pawl and also that it is not frictionally moved rearwardly by the pawl as the latter ratchets thereover during its rearward movements. For this purpose, it is usual to provide a spring-loaded friction pad which engages the top of the strip and presses it downwardly against an abutment at a position arranged below the outer end portion of the pawl and which thus prevents movement of the strip except when it is being positively displaced by the pawl during forward movements of the latter. As, however, the pressure pad must be clear of the pawl when the latter is fully retracted, the distance between the pressure pad and the dies is such that several successive terminals are at all times located forwardly of the pad. This number of terminals is usually wasted at the end of each strip because when the following end of the strip passes the pad, the remaining short strip of unused terminals in advance thereof cannot be accurately registered with the dies and this wastage becomes a significant cost factor when the machine is in constant use, even though the wastage from each spool of terminals is small.

An object of this invention is to provide a terminal applying machine of the aforesaid kind which is adapted to feed the terminals from either or both sides of the dies.

Another object is to provide a terminal applying machine which may be used for applying terminals which are arranged either transversely or longitudinally in the strip, while the operator remains in a fixed position.

A further object is to provide improvements whereby the wastage at the end of each strip of terminals is reduced.

Yet another object is to provide a machine which is relatively small and compact and which is readily and conveniently adjusted.

A still further object is to provide a terminal applying machine which is adapted to sequentially supply terminals from different sides of the die and wherein the machines can be reset so that the operator can, if necessary, control the position in its cycle of the machine or return the machine to the start of its cycle.

Accordingly, this invention in one of its aspects provides a power driven terminal applying machine comprising a normally retracked vertical reciprocable slide adapted to have an upper die attached to its lower end to coact with a fixed die on the frame of the machine, means operable when the machine is started to cause the slide to undergo one forward and return stroke, a reciprocable feed pawl spaced outwardly from one side of the dies and adapted to feed the terminal strip substantially horizontally thereto, means operable to actuate the pawl in timed relation with the slide, and means for transmitting movement from said last mentioned means to actuate a similar driving pawl arranged or capable of being arranged in a similar position at the other side of the coacting dies.

Thus the machine may be used to feed a terminal strip to the dies from either side thereof or to feed two terminal strips from opposite sides and provision is preferably made to enable the stroke of each feed pawl to be adjusted independently.

The invention in a further aspect provides a power driven terminal applying machine including relatively movable coacting upper and lower dies, means to provide relative movement of the dies, a reciprocal feed pawl spaced outwardly from each side of the dies, each feed pawl being adapted to feed a terminal strip substantially horizontally to the dies, means operable to actuate each feed pawl in timed relation to movement of the dies and means to control the vertical location of the feed end of each pawl to thereby cause selective feed of terminals.

Preferably, each pawl is provided with means which can control the feeding movement of the associated pawl relatively to the relative movement of the dies so that feeding occurs only on predetermined die mounts. The control means may be a sprocket wheel associated with the pawl.

Preferably, also, means are provided so that the control means of the pawls can be manually returned to an initial condition.

In order that the invention in its aspects may be more fully understood and put into practice reference will be made to the accompanying drawings which exemplify these various aspects of the invention.

In these drawings:

FIGURE 3 is a side view of the machine, partially in section;

FIGURE 15 is a front view, partly in section, similar to that of FIG. 5 but showing the arrangement where terminals are fed from both the right and the left;

Figure 16:
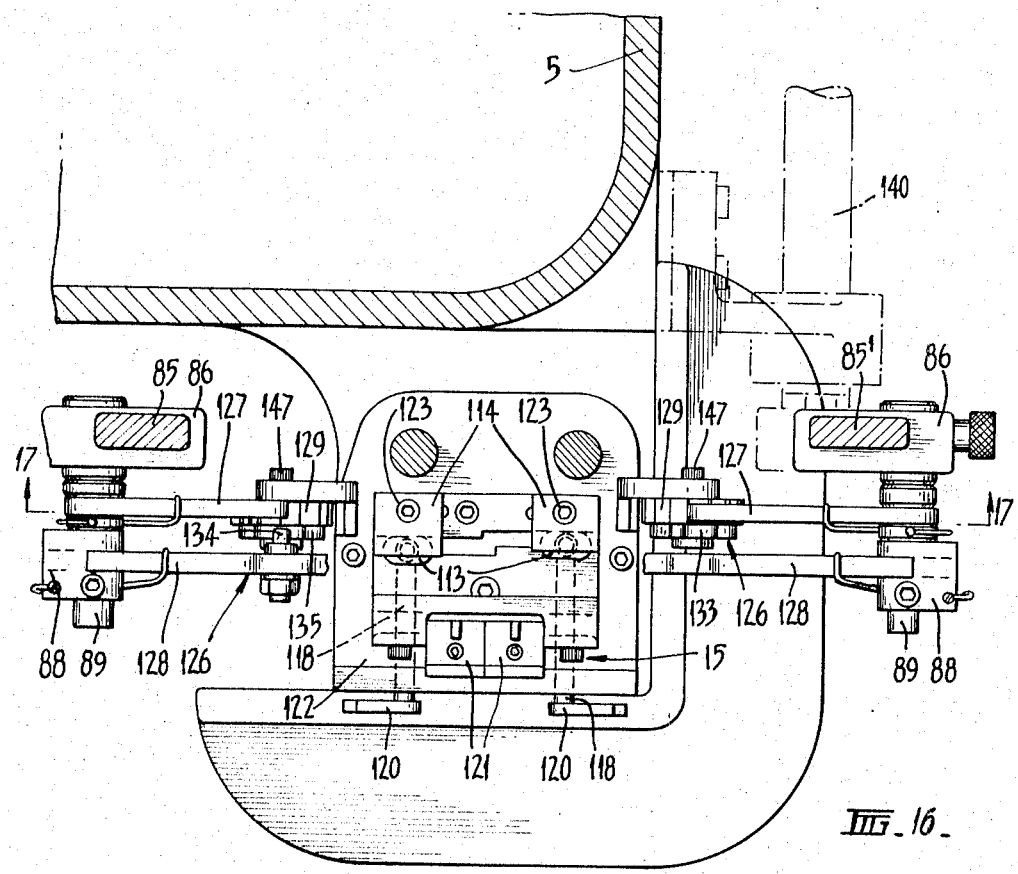
Figure 17:
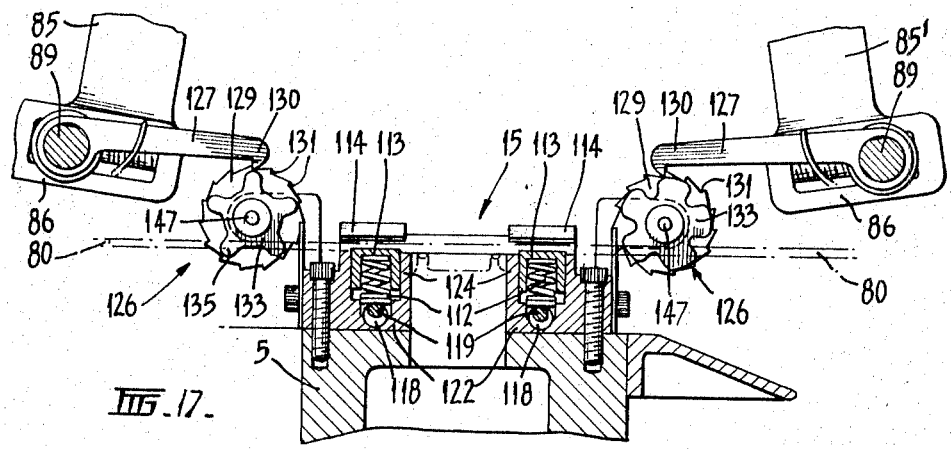

FIGURE 16 is a plan view along line 16—16 of FIG. 15 and illustrating the ratchets pawl arrangement; and FIGURE 17 is a sectional view along line 17—17 of FIG. 16 to illustrate the remainder of the components of the arrangement of FIGS. 15 and 16.

The terminal applying machine 1 is supported on the flat top 2 of a table 3 or stand whereby the machine may be turned about a vertical pivotal axis 4, the table or stand being of a suitable height for a seated operator.

The machine comprises a frame 5 having a flat base 7 which rests on the stand 3 and which forms a casing of approximately rectangular shape which accommodates the driving mechanism.

This mechanism includes a main shaft 8 mounted in suitable bearings 9 and arranged substantially horizontally of the casing.

The forward end of the main shaft 8 is formed with a crank pin 10 arranged vertically above a slidable ram 11 mounted in a guide 12 rigidly secured to the front of the frame 5 and the crank pin 10 is connected to the upper end of the ram 11 by a short connecting rod 13 which is connected to the ram 11 by pivot 17.

When the machine is in use, the upper die set 14 is secured to the lower end of the ram 11 which projects through the guide 12 therefor and a co-acting lower die set 15 is secured to a seating 16 provided therefor on the base 7 of the machine. In order that the lowermost position of the bottom of the ram 11 may be adjusted to suit the particular dies to be used, the aforesaid connecting rod is adjustable in length.

Figure 1:
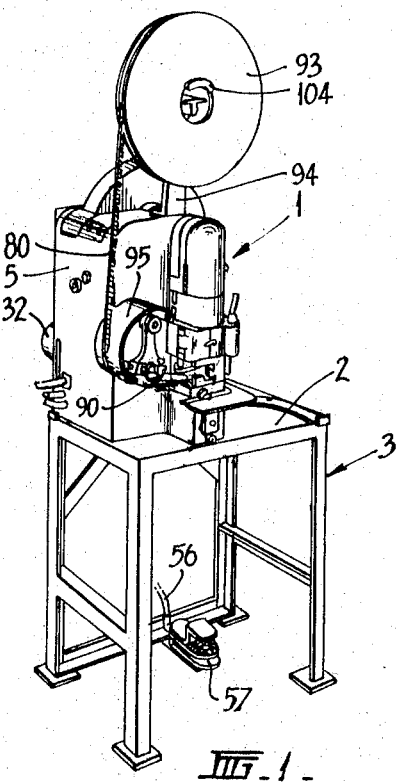
FIGURE 1 is a perspective view of the machine when being used to feed terminals from the left side, as it appears to an operator.
Figure 2:
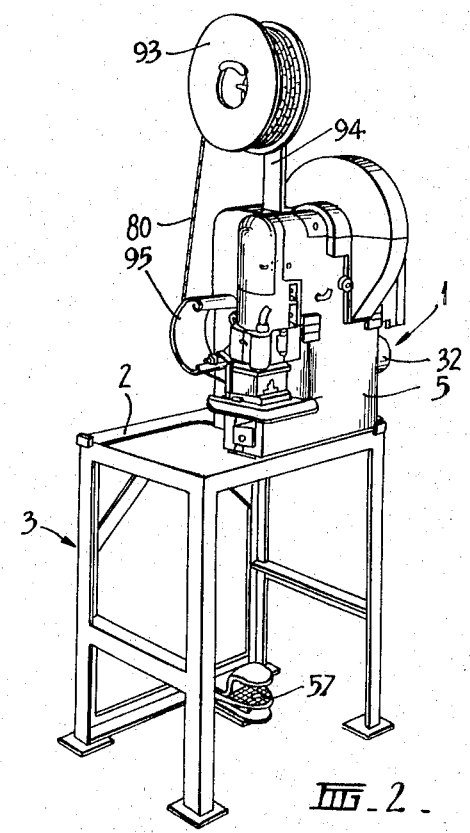
FIGURE 2 is a second perspective view of the same machine when arranged so that the terminals are fed from the rear.
Figure 14:
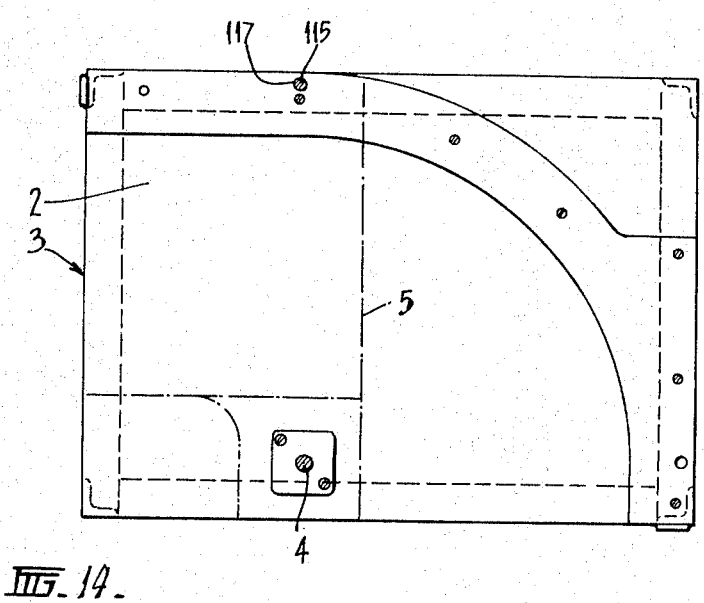
FIGURE 14 is a plan view along line 14—14 of FIG. 3 showing the table-top on which the machine is mounted and the pivot means.
Figure 4:
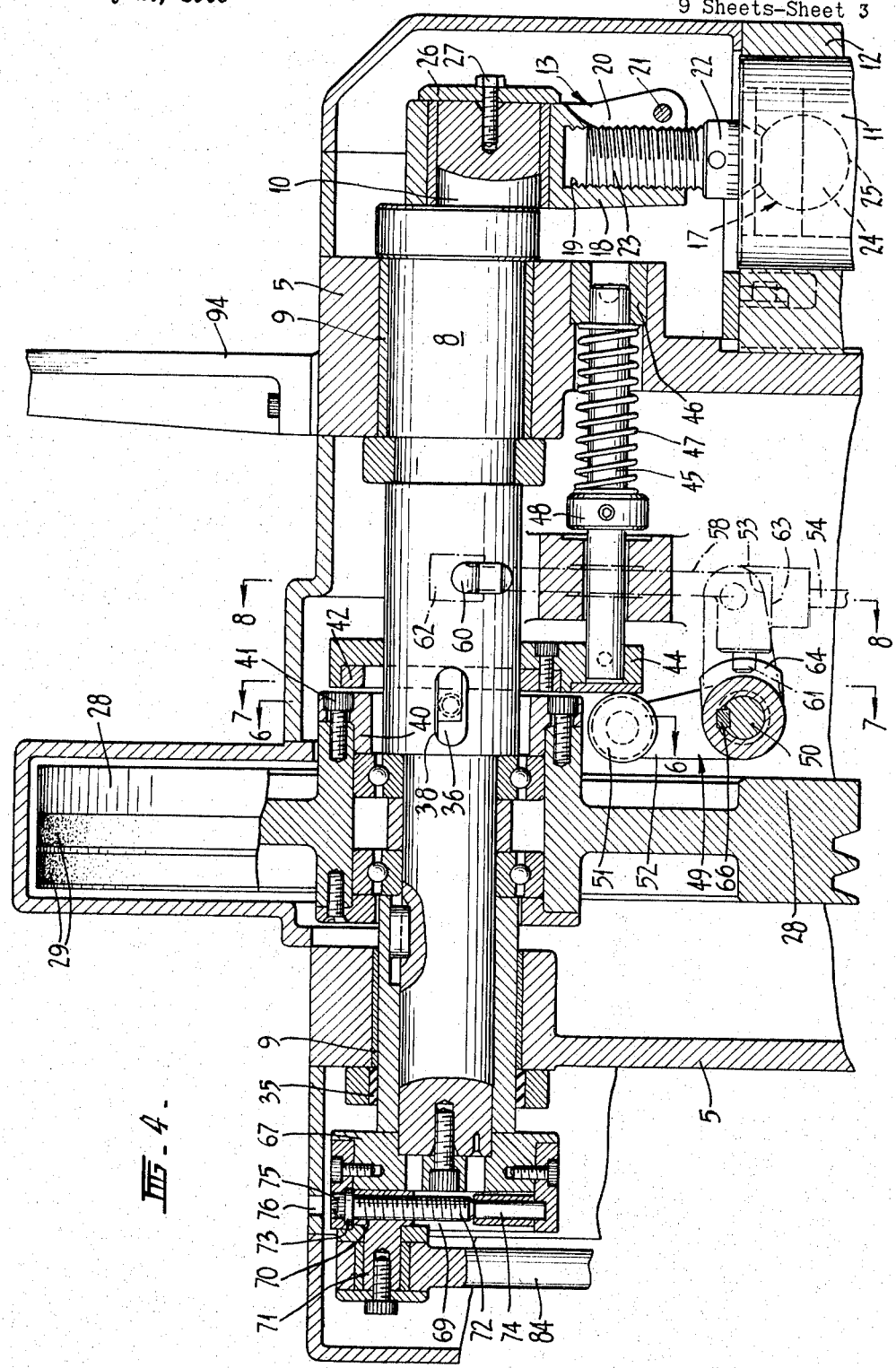
FIGURE 4 is a sectional side view of the upper portion of the machine of a larger scale than the view of FIG. 3.
Figure 5:
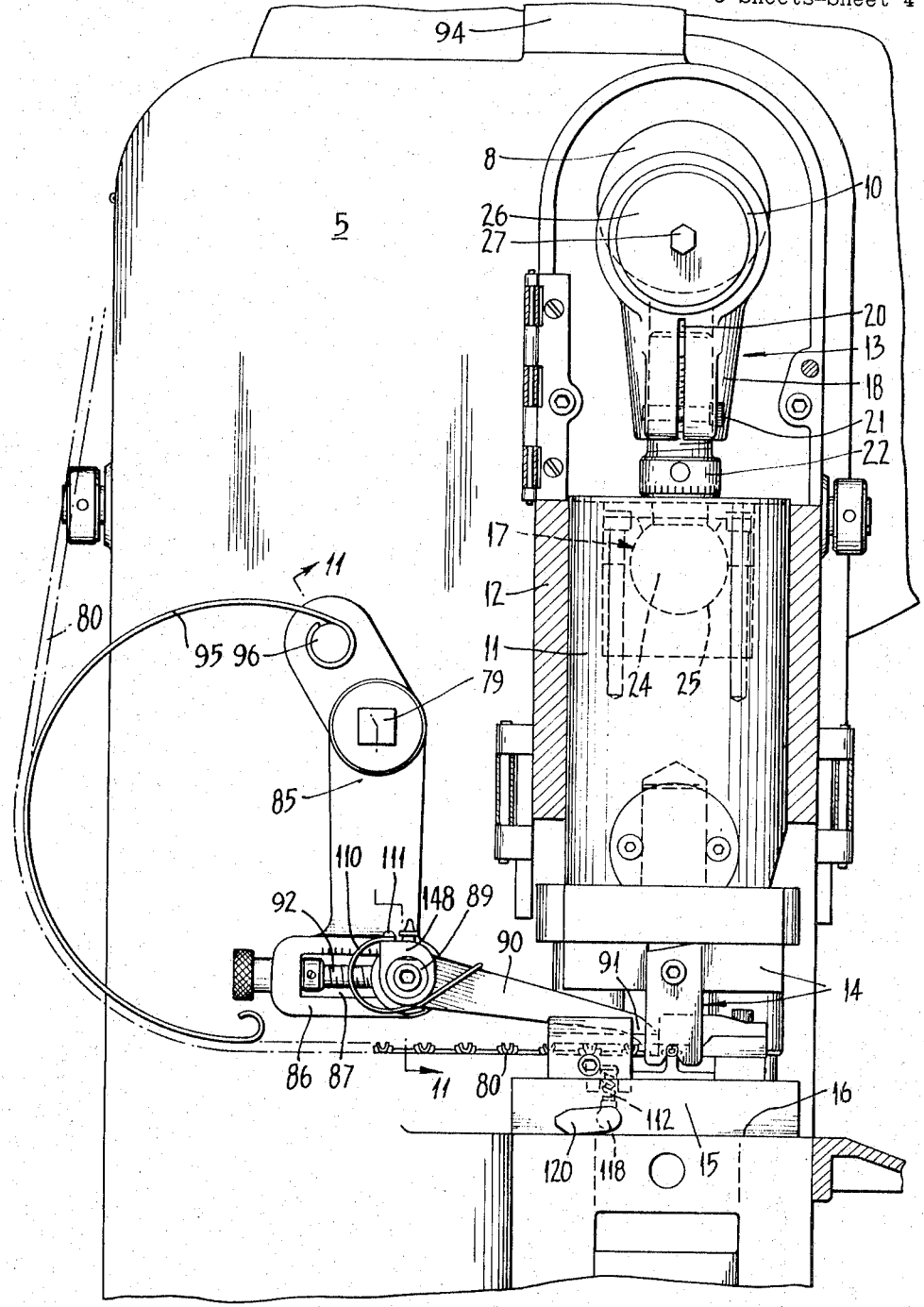
FIGURE 5 is a partial front view of the machine, partially in section, along line 5—5 of FIG. 3 and which shows the feed finger arrangement.
Figure 6:
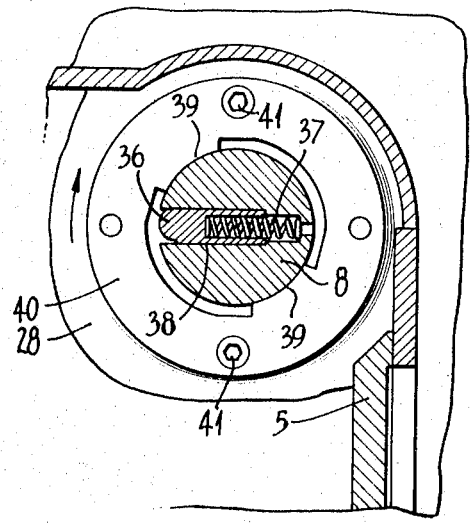
FIGURE 6 is a front sectional view along line 6—6 of FIG. 4.
Figure 8:
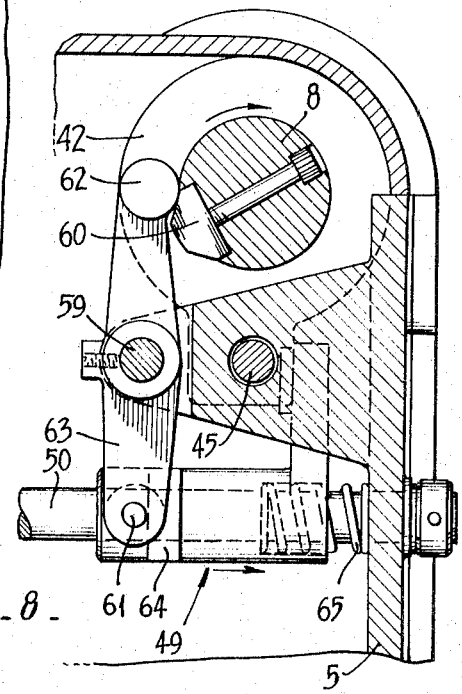
FIGURE 8 is a front sectional view along line 8—8 of FIG. 4 which, together with FIGS. 6 and 7 illustrates the operation of the key-clutch.

As can be seen from FIGURES 4 and 5, the connecting rod 13 includes an outer member 18 which has an internal thread 19 and is provided with a longitudinal slot 20 and a clamping stud 21, which is adapted to distort the portions of the outer member 18 inwardly. The connecting rod 13 also includes an inner member 22 which has an upwardly directed threaded portion 23, which is adapted to be screwed into the internally threaded portion 19 of the outer member and which is provided with a ball 24, which is adapted to be received in and co-operate with a socket 25 which is located within the slidable ram 11 to thereby form the pivot 17. The connecting rod 13 is maintained in position on the crank-pin 10 by means of an annular plate 26 fitted to the end of the crank-pin by means of a screw 27.

A driving pulley 28 which also serves as a flywheel is freely mounted on the main shaft 8 near the rear of the casing, which is suitably enlarged at that position, and this pulley is connected by V-belts 29 to a pulley 30 mounted on the forward end of the spindle 31 of an electric motor 32 which projects from the back of the casing and is connected thereto about a pivot 33 in order that the drive belt 29 may be maintained under a suitable tension.

When the machine is in use, the motor 32 and the flywheel 28 run continuously and a one-revolution key-clutch 34 is provided for connecting the flywheel 28 to the main shaft 8 which is also continuously engaged by a friction brake 35 in the manner which is common in mechanisms of this kind.

The clutch mechanism comprises a spring-loaded key 36 mounted in a key way or slot 38 arranged longitudinally and radially in the main shaft 8. This key 36 is normally depressed in the manner hereinafter described, but when it is released, it is projected outwardly by its associated spring 37 whereby it is engaged by one of a plurality of inward radial abutments 39 formed on the inner periphery of a hardened ring 40 secured to the forward end of the flywheel 28 by studs 41. The main shaft 8 is then constrained to rotate with the flywheel 28.

The key is normally maintained in its depressed or inoperative position by an inward projection 43 on a ring or "eyeglass" member 42 which is freely mounted on the main shaft immediately in advance of the flywheel and which has a short radial projection 44 at the bottom thereof. This depending projection 44 is secured to the rear end of a guide rod 45 which has its forward end slidably received within a guide bush 46 in the frame. The ring or eyeglass member 42 is thus restrained against rotation but is movable axially on the main shaft, and it is normally maintained in its rearmost position by a spring 47 which engages an abutment 48 on the guide rod 45 and the guide bush 46.

Figure 7:
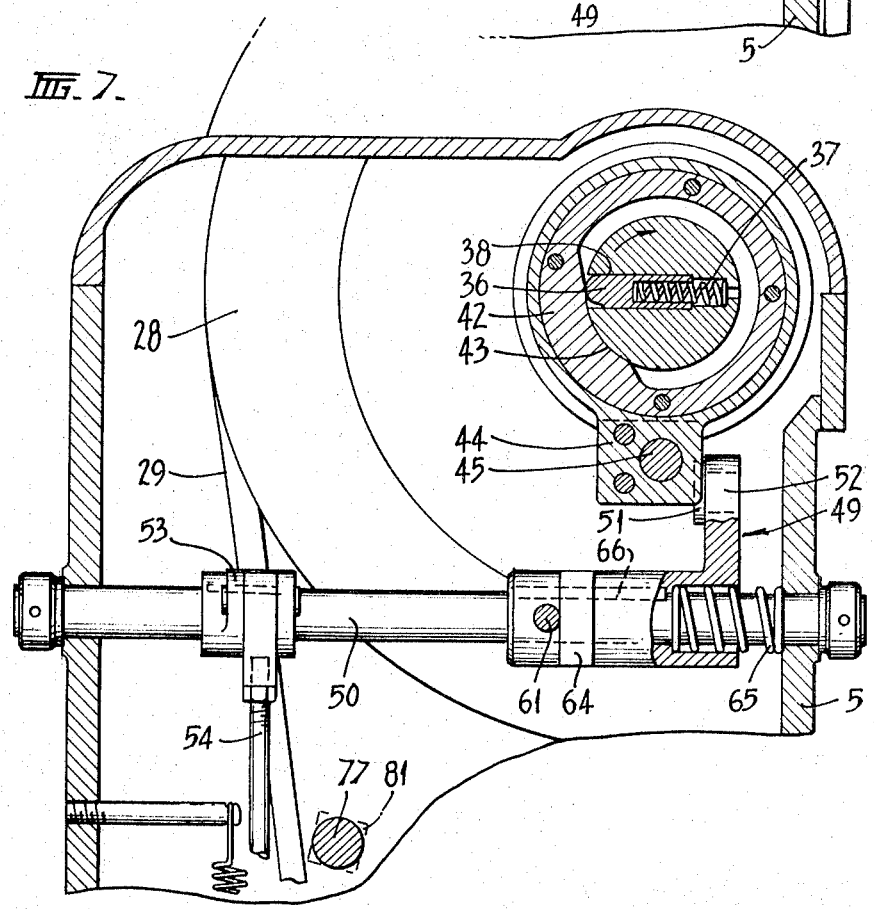
FIGURE 7 is a front sectional view along line 7—7 of FIG. 4.
Figure 9:
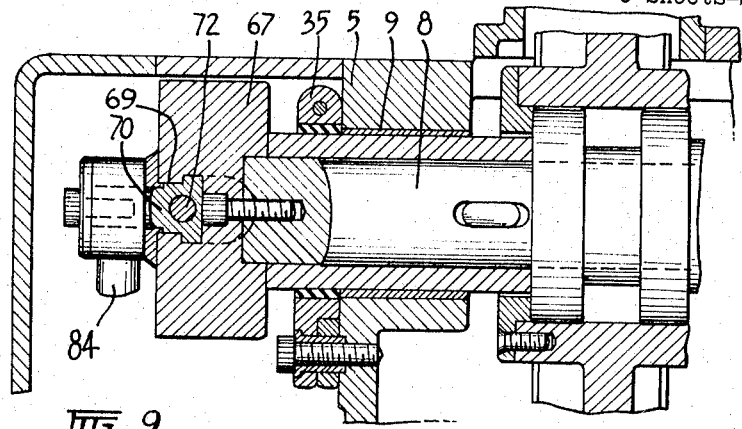
FIGURE 9 is a sectional plan view along line 9—9 of FIG. 3 and shows the arrangement of the rear crank-pin.

In this rearmost position of the eyeglass member 42, the aforesaid inward projection 43 thereon is disposed in the path of rotation of the forward end of the depressible driving key 36 and retains the driving key 36 in its depressed condition, as illustrated in FIGURE 7 and thus there can be no driving interconnection between the key 36 and abutments 39 of the ring 40, when the ring rotates with the flywheel 28. When the eyeglass member 42 is moved forwardly, as hereinafter described, it releases the key 36 which is then projected by its spring 37 so as to be engaged by one of the aforesaid coating radial abutments 39 which rotate with the flywheel and the main shaft 8 is thus constrained to rotate with the flywheel 28.

As hereinafter explained, the eyeglass member 42 returns to its normal rearmost position before the shaft 8 completes one revolution. Thus as the shaft 8 closely approaches the end of one complete rotation, the forward end of the projected key 36 again engages the inward projection 43 on the eyeglass member 42. The key 36 is thus depressed to its inoperative position and the constantly applied brake 35 stops the shaft 8 with the key 36 still held in its depressed position.

The eyeglass member 42 is moved rearwardly by means of a bell crank 49 mounted on a transversely disposed rock shaft 50 arranged below the said member. This bell crank has one arm 52 extending upwardly and fitted with a hardened steel insert 51 arranged to engage the rear face of the radial projection 44 of the eyeglass member, while its other arm 53 extends forwardly and has its free end coupled by a rod 54 to a solenoid 55 arranged within the lower part of the casing.

The winding of the solenoid 55 is connected by flexible conductor 56 of a suitable length to a treadle switch 57 which is placed in any convenient position on the floor below the stand.

In order to ensure that the eyeglass member 42 cannot be retained in its rearmost position by means of the solenoid 55 and thus permit the main shaft 8 to make more than one complete revolution, means are provided for moving the aforesaid bell crank 49 sidewise out of register with the radial projection 44 on the eyeglass before one revolution is completed. For this purpose, an upright rocker lever 58 is pivotally mounted on a pivot rod 59 which is adjacent and parallel to the aforesaid guide rod 45 of the eyeglass member. One end 62 of this lever 58 projects upwardly and its free end is disposed in the path of rotation of a cam 60 which projects radially from the main shaft 8.

The downwardly directed end 63 of the rocker lever 58 is fitted with a laterally projecting pin 61 which is arranged to engage a lug 64 on the aforesaid bell crank 49 and move the latter axially on its spindle and in opposition to a spring 65.

This axial movement of the bell crank 49 moves the upwardly projecting arm 52 thereof out of register with the radial projection 44 of the eyeglass member and so ensures that the main shaft 8 is stopped at the completion of one revolution as above described.

The two arms 52, 53 of the bell crank 49 are formed separately, in which case, the forwardly extending arm thereof is secured to the spindle and the upwardly projecting arm 52 only thereof is axially slidable, and is constrained by a key 66 to turn with the pivot rod 50.

The rear end of the main shaft 8 is fitted with a crank disc 67, the outer face of which is formed with a diametrical guide slot 69 for a slide 70 which carries a rearwardly projecting crank pin 71 by which motion is transmitted to the means for intermittently feeding the terminal strip to the die sets 14, 15. The slide 70 is adjustable to vary the throw of the crank pin 71 which in turn determines the stroke of the feed device and the face of the crank disc 67 has graduations 68 to indicate the length of the stroke and thus facilitate adjustment thereof when a suitably arranged access door at the back of the casing is opened.

The form of adjustment can best be seen from FIGURE 4 where the slide 70 is shown to be internally threaded and a screw 72 passes therethrough. The screw has adjacent its upper end a collar 73 which is located in a recess and its lower end contacts an upwardly directed extension 74 which causes the screw to be located against radial movement. The head 75 of the screw is positioned adjacent an aperture 76 in the casing so that the throw of the crank-pin 71 be altered by simply passing a hexagon wrench through the aperture 76 and rotating the screw. Rotation in one direction will cause the throw of the crank to be increased and the other throw will be decreased.

A horizontal rock shaft 77 disposed parallel to the main shaft is mounted in bearings 78 arranged below the level of the latter within and near the left hand wall of the casing and the forward end 79 of this rock shaft projects through the front of the casing at a suitable height above the terminal strip as it extends horizontally forward to the lower die set 15 as hereinafter described.

The rear end 81 of the rock shaft is fitted with an inwardly projecting arm 82 which has its free end coupled by pivot pin 83 to a connecting rod 84 attached to the crank pin 71 on the rear end of the main shaft so that during each rotation of the latter, the rock shaft 77 is moved angularly in one direction and is then returned to its original position.

Figure 11:
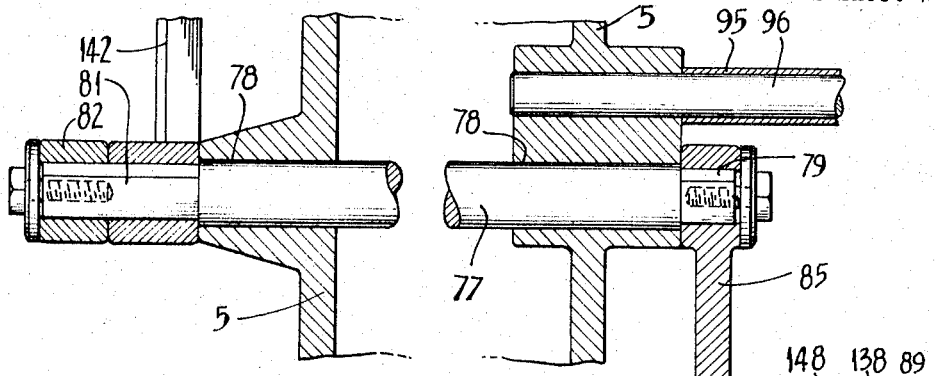
FIGURE 11 is a sectional side view of the feed finger and associate parts, the view being along line 11—11 of FIG. 5.
Figure 12:
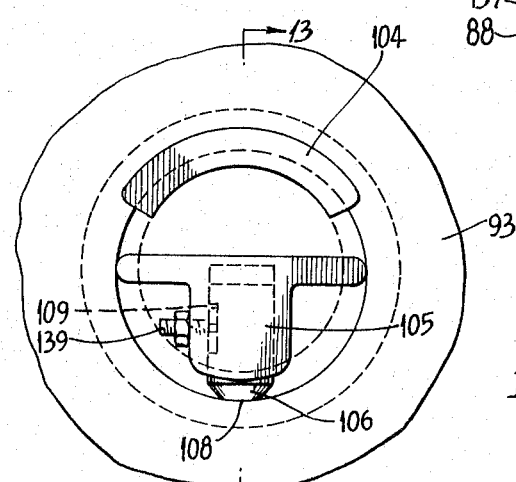
FIGURE 12 is a front view of the spool holding device and is taken along line 12—12 of FIG. 3.
Figure 13:
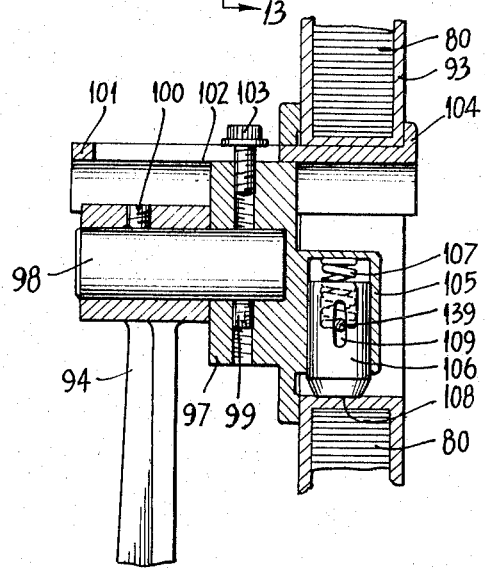
FIGURE 13 is a sectional side view of the spool holding device along line 13—13 of FIG. 12.

The projecting forward end 79 of the rock shaft 77 is fitted with a depending arm 85, the free lower end 86 of which is formed with a substantially horizontal slot 87 fitted with a slide block 88 which carries a forwardly projecting pivot pin 89 for a pawl 90 which extends inwardly therefrom towards the lower die 15 and which has a downwardly projecting free end 91 which is engageable with the upper surface of the terminal strip. The pawl is positioned by a locating block 148 mounted on the pivot pin 89. The arrangement is such that during each inward movement of the pawl 90, the strip 80 is advanced a distance equal to the pitch of the terminals while during each outward stroke of the pawl, its free end 91 ratchets rearwardly over the strip so as to engage the next succeeding terminal. The pawl 90 is retained in its downward position by a spring 110 which is connected to the locating block 148 by a screw 111 and which presses downwardly on the upper surface of the pawl 90. As can be seen from FIGURE 11 the locating block 148 may be moved along the pivot pin 89 so that the pawl acts on the desired part of the terminal, the adjustment of the slide block being by thumb screw 138.

The aforesaid slide block 88 on the free lower end of the depending arm 85 is adjustable by means of a screw 92 in order that the position of the free end 91 of the pawl, when the latter is in its innermost position, may be adjusted in order to ensure that each terminal in turn is moved into accurate register with the dies 14, 15. The screw 92 has a threaded portion 137 which causes the slide block 88 to move with the screw. As previously explained, the stroke of the pawl 90 is regulated by means of the adjustable crank pin 71 on the rear end of the main shaft 8.

The reel or spool 93 on which the continuous strip of terminals is wound is rotatively supported on the upper end of a post 94 which projects upwardly from the top front of the casing, the axis of the spool being parallel to the main shaft.

The terminal strip 80 extends downwardly from the left hand side of the spool and passes around a guide 95 arranged outwardly of the depending pawl-carrying arm 85 at the front of the machine and is then led horizontally inwards therefrom below the pawl 90 and its associated spring 112. Positioned to the lower die 15 as already described.

The said guide 95 for the terminal strip 80 consists of a relatively wide strip of resilient sheet metal which is bent to an arcuate shape and is mounted on the left front of the casing with its convex side directed outwards for engagement by the terminal strip as it descends from the spool and then passes below and in contact with the inwardly turned lower end of the guide from which it passes substantially horizontally to the lower die set as already mentioned.

This curved guide member 95 is advantageously supported only at its upper end on an outwardly directed shaft whereby it is free to flex if an excessive tension should be imparted to the terminal strip.

The spool 93 is rotatively and detachably supported on a mounting fitted to the upper end of the post 94 and which is constructed so as to facilitate the rapid attachment and removal of the spools and to prevent overrunning thereof.

This spool mounting comprises a vertical disc secured by a grub screw 99 to a shaft 98 which, in turn is secured by a grub screw 100 to the post 94 and fitted with a horizontal bar 101 which projects forwards from an upper part of the face thereof. The inner end of this bar has a slot 102 which enables it to slide relative to the disc 97 in order that the effective length of the bar 101 may be adjusted to suit the width of the spool 93 and a locking screw 103 is provided for securing the bar 101 to the disc 97 in a required adjustment position.

The upper surface of this support bar 101, which is shallow in depth, is convex and its radius of curvature is equal to that of the inner periphery of the spool and it may conveniently be of a width such as to extend over about 120° of the circumference of the inner periphery of the spool 93.

At its free forward end, the support bar has an upwardly projecting flange 104 which retains the spool on the bar. The disc is provided below the support bar with a forward projection 105 in which is mounted a vertical plunger, 106 which is loaded by a spring 107 and the lower end of which projects therefrom to engage the bottom of the inner periphery of the spool. This plunger 106 therefore holds the spool 93 down on the bar 101 and also serves as a friction brake to prevent overrunning of the spool when the feed pawl completes each forward stroke.

The plunger 106 is arranged to engage only the inner periphery of the spool and its forward end 108 is curved to provide a lead in for the spool when the latter is being attached. The plunger has a slot 109 into which passes a stud 139 which passes through the projection 105 to limit the downward movement of the plunger 106.

A pressure pad 113, which is actuated by a spring 112, is arranged to engage the lower surface of the continuous terminal strip and press the same upwardly against a fixed abutment 114 and this pressure pad 113 is disposed so close to the die as to engage and hold each terminal in turn as it becomes the leading terminal and is disposed in register with the dies. The arrangement is best illustrated in the second embodiment, to be described in relation to FIGURE 17 of the drawings, although it can also be seen in FIGURE 5. When this is done, the terminal strip may be accurately fed and applied to the last terminal thereon and this has not previously been possible because existing machines of this kind have a pressure pad arranged above the strip and as the feed pawl is also arranged above the strip, the pressure pad has necessarily been arranged some considerable distance from the die to provide clearance for the tip of the feed pawl.

The arrangement of the pressure pad 113 is best seen in the embodiment of FIGURES 15 to 17 which show a modified feed arrangement which has a pair of such pressure pads. Each pressure pad, is however, identical to that used in the embodiment of the earlier figure. As can be seen from these figures the lower die set 15 includes a base 122 to which is connected the die members 121. At the rear of the die set base 122 there is an upwardly directed extension 124 which is provided with a substantially vertical blind aperture extending downwardly from its upper surface. Mounted within this aperture is the pressure pad 113 at the lower end of this aperture is a shaft 118 which shaft has on one end an eccentric member 119 beneath the spring 112 and the other end of the shaft extends forwardly of the die set 15 and is provided at its forward end with a lever arm 120.

The abutment 114 is connected to the upper edge of abutment 124 by means of a screw 23. Examination of FIGURE 16 shows that the pressure pad 113 and its associated abutment 114 are positioned rearwardly of the lower die end the terminal feed is arranged such that the continuous strip of material to which the terminals are connected is so located on the feed that it passes between the pressure pad 113 and the abutment 114. When a strip of terminals is to be connected to the machine the lever arm 120 is rotated through 90° so that the eccentric member 119 assumes its lowermost position thereby releaving the spring pressure and thus the pressure of the pad against the abutment 114. At this position the strip of terminals can be fittted therebeneath and a further rotation of the lever arm 120 effectively retains the terminal strip in the required position.

The shape, actual position and means of spring loading the pressure pad 113 depends on the type of terminal that is to be applied and the lower die set 15 is formed both as far as die members 121 and pressure pads 113 to co-operate with a desired arrangement.

In order that the machine may be conveniently used as a rear feed machine while the operator remains seated at the front of the stand or table 3, the machine is pivoted to the table about a vertical axis 4 which coincides with the axis of the ram which carries the upper die set. For this purpose, the base of the machine is provided at a suitable location spaced from the pivotal axis with means by which it may be locked to the table at predetermined angular positions, e.g., as illustrated, by inserting a locking pin 115 through a hole 116 in the base of the machine and into one of a series of alternative locating holes 117 in the top of the table.

In order therefore to use the machine as a rear feed machine, the locking pin is removed and the machine is swung through an angle of 90° until the right hand side of the machine is at the front.

As the pivotal axis 4 is co-axial with the ram and the dies, the latter remain substantially in the same position relatively to the operator.

Figure 10:
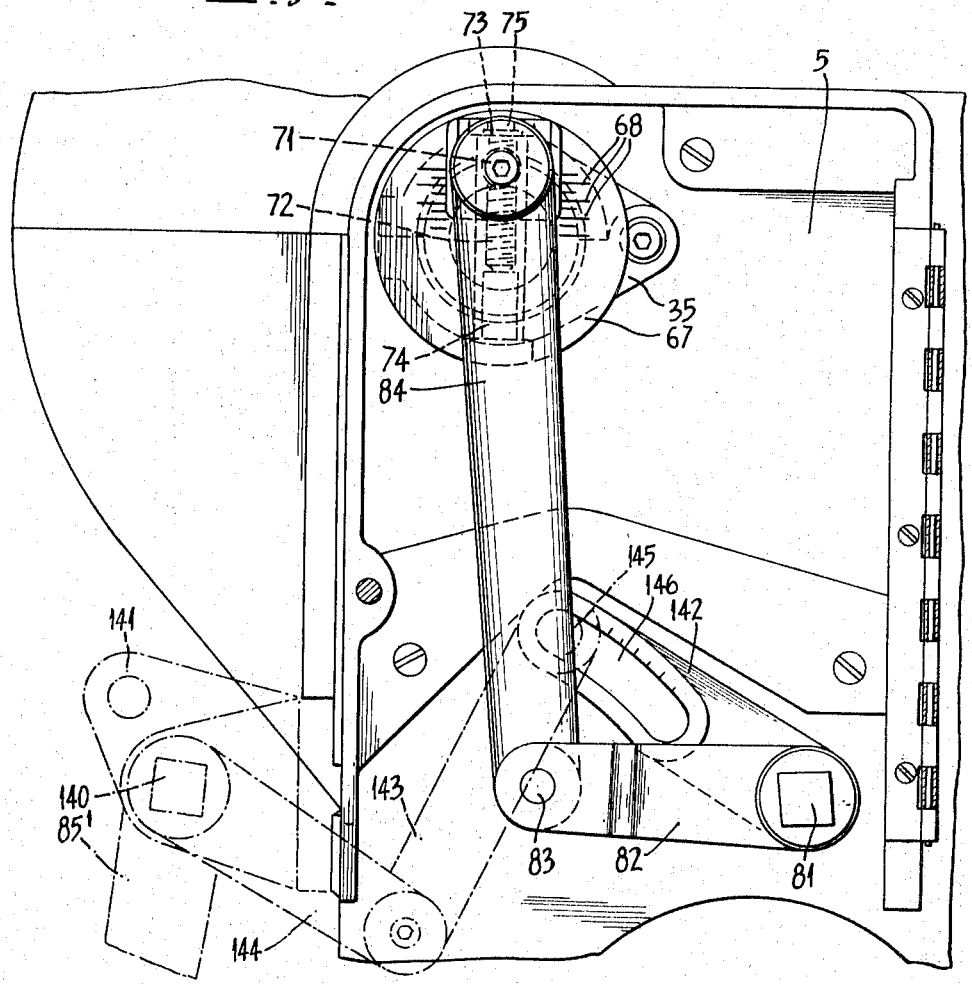
FIGURE 10 is a rear view along the line 10—10 of FIG. 3 showing the lever arrangement for transmitting movement to the feed fingers.

In order that the machine may feed the terminal strip from the right hand side or may feed separate strips simultaneously from both sides, provision is made for attaching a second rock shaft to the right hand side of the machine when looking at the machine from the front. The particular arrangement envisaged is illustrated in FIGURE 10 where a second rock shaft 140 is mounted for rotation in an extension 141 extending from the frame of the machine. Rock shaft 140 is driven by an arm 142 which is constrained to rotate with rock shaft 77, lever arm 143 which is pivotally connected between the arm 142 and a further arm 144 is constrained to move with the rock shaft 140. The degree of rotation of rock shaft 140 can be varied by moving the upper pivot of the lever arm 143 along a slot 146 in the arm 142. A depending arm 85′, which is similar to arm 85 connected to rock shaft 77, is provided on the formed end of rock shaft 140.

The arrangement illustrated in FIGURES 15 and 17 is provided with a second rock shaft and feed pawl arrangement although this embodiment also has additional features which will be described independently.

This second rock shaft 140, when attached, is disposed parallel to the first mentioned rock shaft and at approximately the same distance from the axis of the ram.

The rock shaft may form a part of an attachment assembly which comprises spaced bearings in which the shaft is mounted and which are attachable to appropriate seatings provided therefor on the side of the casing or it may be formed integral with the machine.

The terminal applying machine of the present invention can also be used for cyclically feeding terminals from a strip from each side of the machine and such a machine as illustrated in FIGURES 15 and 17. In this machine a terminal can be fed from either both sides of the machine prior to each movement of the slidable ram 11, the ram arrangement being the same as previously described and with the upper die set 14 including a pair of dies 125 and the lower die set 15 includes a corresponding pair of dies 121. The terminal supply assembly is duplicated in a manner similar to the duplication necessary for the prior embodiment and the main difference in this embodiment to the previously described embodiment is in the pawl 128 which extend inwardly from the slide block towards the lower die. In this embodiment each pawl 128 becomes a pair of pawls which we will described as the ratchet pawl 127 and the feed pawl 128 respectively. Each pawl 127, 128 of the pair is pivotally connected to the forwardly projecting pivot pin 89 on the slide block 88 and each pawl is directed forwardly and inwardly towards the lower die set 15. The innermost pawl 127 is the ratchet pawl and its forward end rests on a ratchet wheel 129 so that this wheel is actuated on the rearward movement of the ratchet pawl 127. To accomplish this movement the ratchet pawl is provided with a hooked forward end 130 so that on movement towards the lower die the pawl can move forwardly over a tooth 131 of the ratchet wheel and on the return movement of the ratchet pawl, the ratchet wheel 129 is caused to move through an angle equal to the angle between two adjacent teeth. The feed pawl 128 is basically identical to the feed pawl 90 previously described and has a downwardly projecting free end 132 which is engageable with the upper surface of the terminal strip 80. Thus normally during each inward movement of this pawl the strip is advanced a distance equal to the pitch of the terminals which can be adjusted as described with relation to pawl 90 whilst during each outward stroke it moves freely over the strip so as to engage the next succeeding terminal.

In order to obtain the cyclic operation there is co-operation between the ratchet wheel 129 actuated by the ratchet pawl 127 and the feed pawl 128. As illustrated the ratchet wheel 129 has associated therewith on the side adjacent the feed pawl a cam assembly 133 and the feed pawl is provided with an inwardly directed pin 134 connected thereto which can co-operate with this cam 133. When a cam lobe 135 is in a position so as to cause the pin 134 to lift, this lifting will be transmitted to the feed pawl 128 and thus during the next forward movement the feed pawl will be held above the terminals at least until it passes over an upwardly directed part of the terminal and thus these will not be moved towards the lower die set 15. The pin 134 is fitted to a slot 136 in the upper surface of the feed pawl 128 so that the lifting of the feed pawl can be adjusted.

It can be seen that using an arrangement of this type on each side of the die set, as illustrated, the feed from each side can be controlled so that at any movement a terminal can be fed to the dies from either side or, if required, from both sides. Also it can be seen that should the apparatus be required to continuously feed from each side, this can be done simply by removing the pin 134 which thus prevents the lifting of the feed pawl 128 and thus permits the feed pawl to act in the conventional manner.

The ratchet wheel 129 and cam assembly 133 can be turned manually by the operator to any required position in its cycle. This is important if, for example, one terminal is not applied or is incorrectly applied and the cycle has to be repeated.

The cycle from each side can readily be varied by varying or replacing the cam, which is normally provided with the ratchet wheel, and so normally the ratchet and the cam assembly are replaced. The alteration is normally by altering the number of teeth on the ratchet wheel and the lobes on the cam.

Two different cam arrangements are shown in the embodiment illustrated in FIGURES 15 and 17 the left cam is arranged to feed two terminals in succession and then to emit feeding a terminal during the next stroke of the ram whilst the right cam omits feeding terminals for two strokes in succession and then feeds a terminal during the third stroke of the ram. If necessary the cams can be arranged so that terminals are fed from both sides during the same stroke or, alternatively, so that no terminal is fed during a stroke.

For more readily understanding the value of this arrangement we will mention two circumstances under which such a form of feeding is of value. In the first form a terminal is crimped to a conductor and a rigid insulator is then introduced over the crimped portion and a second station is provided to crimp the insulator into its permanent position, so whilst the terminal is being crimped to the conductor, feeding must not take place in order to be able to crimp the insulator in the next station.

In a second variation a ring-tongued terminal may be fed from one side of the machine, crimped, then a quick connect terminal is crimped to a second conductor. In this form in a cycle of two movements there is a single feed from the left, no feed from the left side whilst the conductor is being crimped, a single feed from the right and again no feed from the side whilst the conductor is being crimped. The present modification of the invention as can be seen is eminently satisfactory for such arrangements.

The present arrangement has a still further advantage in that if a terminal is incorrectly applied or not applied for some reason the machine operator can, by rotation of the ratchet wheels, return these to any desired position in the cycle to enable the cycle to be completed. This rotation may be done manually or if desired a mechanism may be provided which enables one or both ratchets to be moved from a position away from the ratchet wheels.

The invention therefore provides a versatile construction of terminal applying machine capable of being used for feeding a terminal strip and/or strips from the left and/or right hand sides of the machine while also by turning the machine through an angle of 90° so that one side thereof is then at the front, the strip may be fed forwardly from what is then the rear of the machine without changing the position of the operator. In addition, the attachment and removal of spools is facilitated and wastage at the end of the strips is reduced or avoided.

What is claimed is:

1. A power driven terminal applying machine comprising a normally retracted vertically reciprocal slide adapted to have an upper die attached to its lower end to coact with a fixed die on the frame of the machine, means operable on actuation of the machine to cause the slide to undergo one forward and return stroke, a reciprocal feed pawl spaced outwardly from one side of the dies and adapted to feed a terminal strip substantially horizontally thereto, means operable to actuate the pawl in timed relation with the slide, and means adapted to transmit movement from said last mentioned means to actuate a similar driving pawl arranged or capable of being arranged in a similar position on the other side of the coacting dies.

2. A machine as claimed in claim 1 wherein the means operable on actuation of the machine to cause the slide to undergo one forward and one return stroke includes a substantially horizontal main shaft, a crank on the forward end of the main shaft in operative connection with the slide and means to selectively drive the main shaft and means to ensure the main shaft completes one full revolution when actuated.

3. A machine as claimed in claim 2 wherein the main shaft has a pulley mounted thereon and adapted for rotation relative thereto, the pulley continuously rotating when the machine is in operation and clutch means to selectively engage the pulley into driving relationship with the main shaft and having means whereby the clutch continues to be engaged for one full revolution of the main shaft.

4. A machine as claimed in claim 2 comprising a rock shaft for driving the feed pawl, said rock shaft being partially rotated and returned to its initial condition in timed relation with the slide, the rock shaft, being subsantially horizontal.

5. A machine as claimed in claim 4 comprising a crank adjacent the rear of the main shaft and rotatably connected thereto, said crank being coupled to the rock shaft to drive the same.

6. A machine as claimed in claim 5 wherein the rock shaft includes an extension, a pivotal lever arrangement connected to said extension, and a second rock shaft positioned at the side of the machine on the side of the dies away from the first rock shaft and driven by said pivotal lever arrangement.

7. A machine as claimed in claim 6 comprising means to adjust the degree of rotation of the second rock shaft relative to the first rock shaft.

8. A machine as claimed in claim 5 comprising means for adjusting the eccentricity of the crank to vary the degree of rotation of the rock shaft.

9. A machine as claimed in claim 6 wherein the forward end of each rock shaft has a downwardly extending arm to which is rotatably connected the associated feed pawl, the free end of which is directed towards the die set.

10. A machine as claimed in claim 9 comprising two members connected to each pawl and movable relative to the associated downwardly extending arm to thereby adjust the stroke of the arm.

11. A machine as claimed in claim 9 comprising elastic means biasing the feed pawl towards the lower die set.

12. A power driven terminal applying machine including relatively movable coacting upper and lower dies, means to provide relative movement of the dies, a reciprocal feed pawl spaced outwardly from each side of the dies, each feed pawl being adapted to feed a terminal strip substantially horizontally to the dies, means operable to actuate each feed pawl in timed relation to movement of the dies and means to control the vertical location of the feed end of each pawl to thereby cause selective feed of terminals.

13. A machine as claimed in claim 12 wherein the means to control the vertical location of the feed end of each pawl includes a cam member mounted on the machine so as to lift the feed end of the pawl when a lobe of the cam is in a predetermined position.

14. A machine as claimed in claim 13 wherein each feed pawl has a pin extending outwardly therefrom and adapted to rest on the cam member.

15. A machine as claimed in claim 13 wherein the cam member is rotatable so that lobes of the cam can cause lifting of the feed pawl but at intermediate portions the pawl is urged towards the terminal strip by spring means.

16. A machine as claimed in claim 13 wherein the cam member has a ratchet member associated therewith, a ratchet pawl being provided to move the ratchet member and thereby alter the relative position of the cam member relative to the feed pawl.

17. A machine as claimed in claim 16 wherein the ratchet pawl is mounted coaxially with the feed pawl and is so arranged as to rotate the ratchet and associated cam whilst the pawls are returning to their initial condition.

18. A machine as claimed in claim 13 comprising means whereby the cam member may be manually moved to any required position.

References Cited
UNITED STATES PATENTS

| | | | |
|---|---|---|---|
| 2,760,195 | 8/1956 | Berg | 29—203 |
| 3,004,581 | 10/1961 | Krol et al. | 29—203 |
| 3,137,929 | 6/1964 | Lyon et al. | 29—203 |
| 3,268,992 | 8/1966 | Ianuzz et al. | 29—203 |

THOMAS H. EAGER, *Primary Examiner.*